United States Patent
Abu Qura

(10) Patent No.: US 12,067,793 B2
(45) Date of Patent: Aug. 20, 2024

(54) ENTEROBIUS VERMICULARIS DETECTION SYSTEM

(71) Applicant: Mohd Amin Abu Qura, Saint Cloud, FL (US)

(72) Inventor: Mohd Amin Abu Qura, Saint Cloud, FL (US)

(*) Notice: Subject to any disclaimer, the term of this patent is extended or adjusted under 35 U.S.C. 154(b) by 455 days.

(21) Appl. No.: 17/235,888

(22) Filed: Apr. 20, 2021

(65) Prior Publication Data
US 2021/0334971 A1  Oct. 28, 2021

Related U.S. Application Data

(60) Provisional application No. 63/013,922, filed on Apr. 22, 2020.

(51) Int. Cl.
| | | |
|---|---|---|
| *G06T 7/00* | (2017.01) | |
| *G01S 17/89* | (2020.01) | |
| *G06K 9/00* | (2022.01) | |
| *G06K 9/46* | (2006.01) | |
| *G06V 20/69* | (2022.01) | |

(52) U.S. Cl.
CPC .............. *G06V 20/69* (2022.01); *G01S 17/89* (2013.01); *G06T 7/0014* (2013.01); *G06V 20/693* (2022.01); *G06V 20/695* (2022.01); *G06T 2207/10028* (2013.01); *G06V 2201/03* (2022.01)

(58) Field of Classification Search
CPC .... G06V 20/69; G06V 20/695; G06V 20/693; G06V 2201/03; G01S 17/89; G06T 7/0014; G06T 2207/10028
See application file for complete search history.

(56) References Cited

U.S. PATENT DOCUMENTS

| | | | |
|---|---|---|---|
| 2008/0311600 A1* | 12/2008 | Elsemore | G01N 33/5308 530/389.1 |
| 2013/0287252 A1* | 10/2013 | Bruun | G06V 20/698 382/103 |
| 2013/0317369 A1* | 11/2013 | Bryant-Greenwood | G06T 7/0012 382/128 |
| 2017/0103504 A1* | 4/2017 | Jiménez Cisneros | G06T 7/62 |
| 2018/0322327 A1* | 11/2018 | Smith | G06V 20/698 |

FOREIGN PATENT DOCUMENTS

JP  2013167491 A * 8/2013

* cited by examiner

*Primary Examiner* — Edward F Urban
*Assistant Examiner* — Duy Tran

(57) ABSTRACT

An *Enterobius vermicularis* detection system is provided comprising a sample substrate, a sample disposed upon the sample substrate, and a personal computing device comprising an imaging device for acquiring one or more digital images of the sample substrate. The personal computing device may operate a digital interface allowing the acquired one or more digital images to be uploaded to one or more analysis computation servers. The one or more analysis computation servers may execute an analysis process upon the uploaded one or more digital images allowing determination of a presence of one or more *Enterobius vermicularis* eggs within the sample. The analysis process may output a first confidence interval value representing a likelihood of the presence of one or more *Enterobius vermicularis* eggs within the sample. The one or more analysis computation servers may communicate the first confidence interval value to the personal electronic device.

17 Claims, 3 Drawing Sheets

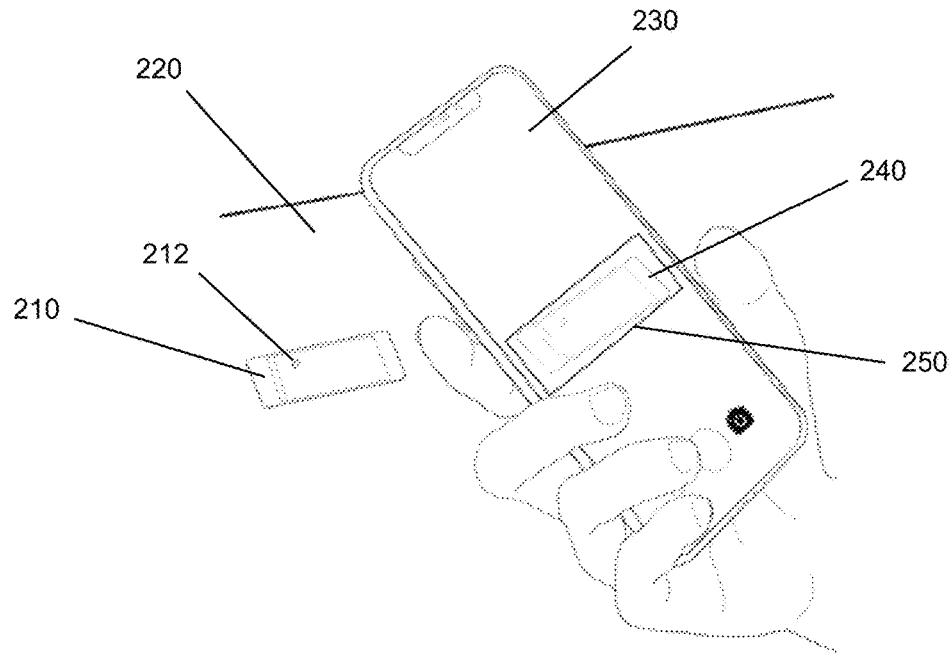
200      Figure 2
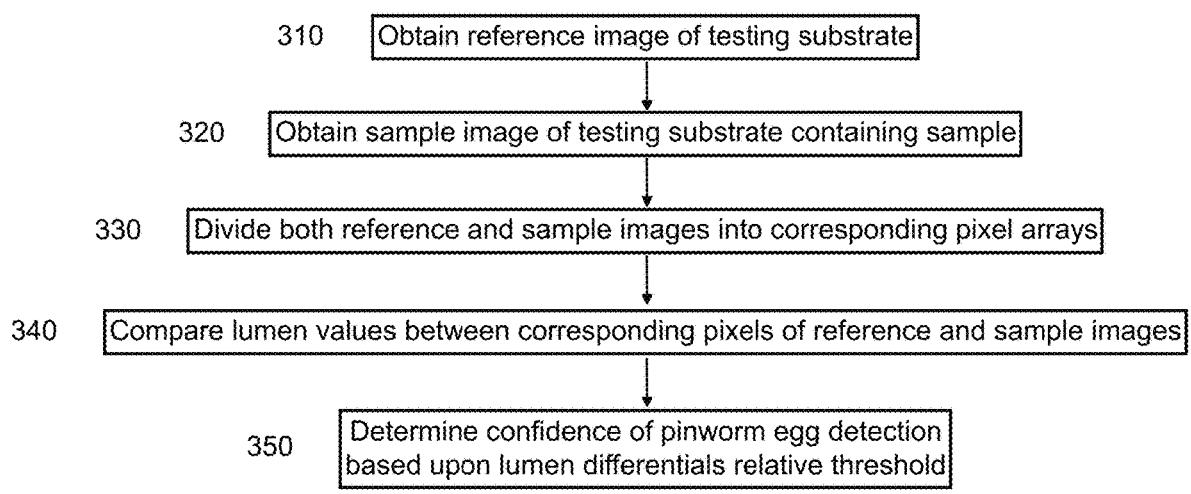
300      Figure 3

ENTEROBIUS VERMICULARIS DETECTION SYSTEM

CROSS-REFERENCE TO RELATED APPLICATIONS

This application claims priority to U.S. Provisional Patent Application Ser. No. 63/013,922, entitled "*Enterobius Vermicularis* Detection System," filed Apr. 22, 2020. The contents of this application are hereby incorporated by reference in their entirety.

BACKGROUND OF THE INVENTION

This invention relates generally to devices, kits and methods for detecting the presence of *Enterobius vermicularis* (or pinworms) in a sample. The pinworm is of the species *Enterobius vermicularis* and is also sometimes referred to as threadworm or seatworm. Pinworm is a parasitic roundworm that is a common intestinal parasite. The presence of pinworm in hosts is known as pinworm infection or enterobiasis.

Pinworm eggs laid by the female worms are colorless, translucent and typically are not visible to the naked eye since, on average, they are only about 50 to 60 micrometers long and 20 to 32 micrometers wide. Pinworm eggs are typically narrow, elongated and asymmetrical with one side flattened and the other side being convex.

Pinworm infections are one of the most common types of human intestinal worm infections throughout the world. Pinworms are very easily spread and most commonly infect children particularly when they do not wash their hands after using the bathroom. The eggs can be spread from touching infected surfaces such as toys, clothing or bedding which transfers the eggs to the hands or under the fingernails. From there the eggs are transferred to food surfaces, are inhaled or are otherwise transferred to the mouth. Pinworms can live up to several weeks on clothing, bedding, toys and the like at normal temperatures.

The female pinworms may lay thousands of eggs on the skin surrounding the anus while the person sleeps. Then they move through the rectum to the lower intestine. When they reach the lower intestine they grow to adult size in about two to six weeks. The symptoms experienced by the infected person are caused by the female pinworm laying her eggs. As previously stated, the eggs are typically laid while the person is sleeping, therefore symptoms are most prominent at night.

Typical symptoms of pinworm infections include anal itching, restless sleep, vaginal itching, abdominal pain or discomfort, and irritability. More severe infections can result in a variety of other symptoms such as nervousness, weight loss and loss of appetite. Sometimes rare complications can occur including vaginal inflammation, bacterial infection, urinary tract infection, appendicitis, and abdominal infection.

Pinworm infections can be confirmed by a visual diagnosis of the female worms or eggs. Typical prior art methods of detecting pinworm include microscopic examination of fecal samples or the tape test. Fecal samples are not as effective since the pinworm eggs are typically found around the anal area or in the intestines. A tape test utilizes a piece of transparent tape that is applied against the skin around the anal area in the morning. The tape is then taken to a healthcare provider where the pinworms or eggs can be identified under a microscope.

There are many disadvantages of these traditional testing techniques. Fecal samples and tape tests are time consuming due to the requirement of making an appointment with a doctor since short term appointments are not always available. It also takes time for a professional to examine and analyze the samples. Costs also include transportation expenses, appointment fees, absence from work or school, labor costs of the professional physically analyzing the samples.

Other disadvantages are the embarrassment and stigma that affect the infected individual, especially in children. This embarrassment and stigma can negatively affect the child's mental health, personality, self-respect and confidence in addition to their physical well-being. These issues could even be a deterrent for some to seek out medical treatment which can prolong symptoms and even cause more serious complications in the absence of treatment. The process of doing these tests and having to go into a doctor's office risks further infection of others. Many individuals also have to handle the samples during testing, transportation and examination. This not only exposes the individuals involved to the pinworm infections but also to other pathogens.

Due to the many disadvantages of typical testing techniques for pinworms, there is a need for new ways of diagnosing pinworm infection that will overcome these issues. Specifically, an at home test that can be performed and analyzed from home would be advantageous. At-home laboratory tests are becoming more popular for various medical diagnoses to overcome the aforementioned disadvantages. In addition, providing an at-home test for pinworms allows a person to test multiple days in a row. This provides much more reliable diagnosis and virtually eliminates the possibility of false negative and false positive test results.

SUMMARY OF THE INVENTION

In some embodiments, the present invention may include a kit with an adhesive substrate that is used to obtain a sample for analysis. The adhesive substrate may be applied to a portion of skin, most preferably the skin around the anus, but it may also be applied to the skin on the hands or around the fingernails. The adhesive substrate may be located on a colored background to provide visual contrast. The individual may follow simple instructions provided to take an image of the sample, upload the digital image to one or more servers which are then able to determine a likelihood of presence of pinworm eggs. A software interface may suggest a treatment or medication depending upon test results.

One type of kit that may be used is an envelope test kit. The envelope test kit may include a substrate layer, an adhesive layer and a protective layer. The protective layer may be removed exposing the adhesive layer to be applied to the affected skin. A container or envelope may be provided to safely dispose of the sample. One advantage that this kit has over prior art tape tests is that the substrate layer can be colored to provide visual contrast for more accurately analyzing the digitized image.

Another type of kit that can be used is a paddle test kit comprising a handle and a paddle. The paddle may be colored to provide high contrast and includes an adhesive layer thereon to collect a sample from skin. The paddle may comprise a handle in the form of a cap. The cap may be threaded to thread onto a container for safe storage and disposal of the sample.

Another type of kit that can be used is a finger cover test kit. The finger cover test kit includes one or more finger covers that have an internal or external adhesive. For finger covers with the adhesive on the inside, the finger covers are to be applied to the fingers immediately after the person wakes up to adhere to anything on the fingers or under the fingernails, since the person may itch the affected area throughout the night. The finger covers may be colored to provide high contrast for imaging.

A unique multistep analysis process may also be utilized. Each step may implemented in any order to determine the presence and count of pinworm eggs in a sample. Further, one or more of these steps may be utilized to more accurately define a previously determined presence and count of pinworm eggs in the sample. The sample may be scanned using LIDAR imaging techniques by measuring the time and wavelength of reflected laser light. These measurements may be used to make a digital 3D topographical map of the sample which can then be used to determine the presence of pinworm eggs in the sample.

The method may include retrieving a sample, digitizing the sample, uploading the digital image to one or more servers, and analyzing the digital image with an analysis process. Positive or negative results may be given to the individual and treatment or medication is suggested. A confidence value may be calculated by the analysis process which can indicate how accurate the positive or negative results may be. Although this invention is directed towards pinworm infection, the techniques may be used to detect other diseases such as toxocariasis and cysticercosis infections, for example.

BRIEF DESCRIPTION OF THE DRAWINGS

FIG. 2 is a view of a sample of an envelope test kit being digitized in accordance with some embodiments of the present invention.

FIG. 3 is a flow chart of a detection method comparing lumen values between sample and reference images in accordance with some embodiments of the present invention.

DETAILED DESCRIPTION OF THE INVENTION

Figure 1A:
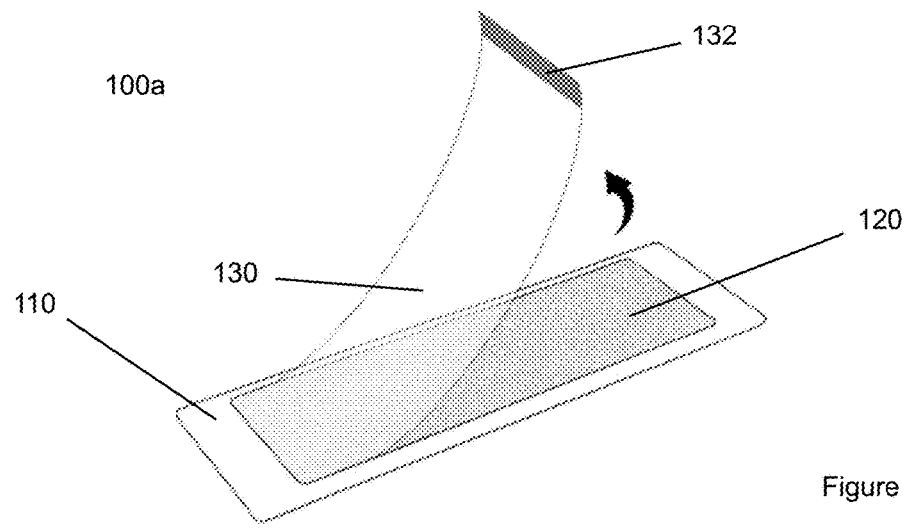
FIG. 1A is a view of an envelope test kit in accordance with some embodiments of the present invention.

Before describing the present invention in detail, it is to be understood that the invention is not limited to any one of the particular embodiments, which of course may vary. It is also to be understood that the terminology used herein is for the purpose of describing particular embodiments only, and therefore is not necessarily intended to be limiting. As used in this specification and the appended claims, terms in the singular and the singular forms "a," "an," and "the" include plural referents unless the context clearly dictates otherwise. Thus, for example, reference to "an *Enterobius vermicularis* detection system" also includes a plurality of *Enterobius vermicularis* detection systems and the like.

In some embodiments, an *Enterobius vermicularis* detection system is provided, comprising a sample substrate; a sample disposed upon the sample substrate; a personal computing device comprising an imaging device acquiring one or more digital images of the sample substrate; the personal computing device operating a digital interface allowing the acquired one or more digital images to be uploaded to one or more analysis computation servers; and the one or more analysis computation servers executing an analysis process upon the uploaded one or more digital images allowing determination of a presence of one or more *Enterobius vermicularis* eggs within the sample, wherein the analysis process outputs a first confidence interval value representing a likelihood of the presence of one or more *Enterobius vermicularis* eggs within the sample, and wherein the one or more analysis computation servers communicate the first confidence interval value to the personal electronic device.

In some embodiments, the one or more digital images comprise one or more reference images and one or more sample images; and the analysis process measures a first lumen value of the one or more reference images and a second lumen value of the one or more sample images, wherein the first lumen value is differentially compared to the second lumen value in order to determine the first confidence interval value.

In some embodiments, the one or more digital images comprise one or more reference images and one or more sample images; the analysis process divides the one or more reference images into a first array of pixels and the one or more sample images into a second array of pixels corresponding to the first array of pixels; and the analysis process measures a first plurality of lumen values for the first array of pixels and a second plurality of lumen values for the second array of pixels, wherein the first plurality of lumen values are differentially compared to the second plurality of lumen values in order to determine the first confidence interval value.

In some embodiments, the analysis process shifts the first array of pixels a distance equal to a fraction of a pixel dimension to create a first shifted array of pixels and the second array of pixels the distance equal to the fraction of a pixel dimension to create a second shifted array of pixels; and the analysis process measures a third plurality of lumen values for the first shifted array of pixels and a fourth plurality of lumen values for the second shifted array of pixels, wherein the third plurality of lumen values are differentially compared to the fourth plurality of lumen values in order to determine a second confidence interval value.

In some embodiments, the analysis process divides each pixel of the second array of pixels into a plurality of sub-pixels and measures a sub-pixel lumen value for each of the plurality of sub-pixels; and the analysis process compares a distribution of the sub-pixel lumen values to a normal Gaussian distribution and determines a second confidence interval value based upon the comparison.

In some embodiments, an optical watermark disposed upon the sample substrate, wherein the optical watermark simulates optical characteristics of the one or more *Enterobius vermicularis* eggs; the one or more digital images comprise the optical watermark and the sample, wherein the analysis process divides the one or more digital images into an array of pixels; the analysis process identifies one or more optical watermark pixels of the array of pixels containing the optical watermark; and the analysis process measures a first lumen value of the one or more optical watermark pixels and a second plurality of lumen values for each remaining pixel of the array of pixels, wherein the first lumen value is differentially compared to each of the second plurality of lumen values in order to determine the first confidence interval value.

In some embodiments, the imaging device comprises a LIDAR sensor and the one or more digital images comprise one or more LIDAR images; and the analysis process identifies one or more objects within the one or more LIDAR images and compares the identified one or more objects to a plurality of reference parameters in order to determine a second confidence interval value.

In some embodiments, the sample substrate is exposed to ultraviolet light prior to acquiring the one or more digital images of the sample substrate.

In some embodiments, after the acquired one or more digital images are uploaded to one or more analysis computation servers, the one or more digital images are analyzed by one or more human technicians to determine a second confidence interval value.

In some embodiments, prior to the one or more digital images being acquired by the imaging device, one or more contrast agents are added to the sample substrate and the sample In some embodiments, a second confidence interval is generated by visual analysis of the sample after addition of the one or more contrast agents.

In some embodiments, an *Enterobius vermicularis* detection system is provided comprising: a sample substrate; a sample disposed upon the sample substrate; a personal computing device comprising an imaging device acquiring one or more digital images of the sample substrate, wherein the one or more digital images comprise one or more reference images and one or more sample images; the personal computing device operating a digital interface allowing the acquired one or more digital images to be uploaded to one or more analysis computation servers; the one or more analysis computation servers execute an analysis process upon the uploaded one or more digital images allowing determination of a presence of one or more *Enterobius vermicularis* eggs within the sample, wherein the analysis process divides the one or more reference images into a first array of pixels and the one or more sample images into a second array of pixels corresponding to the first array of pixels; the analysis process outputs a first confidence interval value representing a likelihood of the presence of one or more *Enterobius vermicularis* eggs within the sample, wherein the analysis process measures a first plurality of lumen values for the first array of pixels and a second plurality of lumen values for the second array of pixels, wherein the first plurality of lumen values are differentially compared to the second plurality of lumen values in order to determine the first confidence interval value; and the one or more analysis computation servers communicate the first confidence interval value to the personal electronic device.

In some embodiments, an *Enterobius vermicularis* detection system is provided comprising: a sample substrate; a sample disposed upon the sample substrate; a personal computing device comprising an imaging device acquiring one or more digital images of the sample substrate, wherein the imaging device comprises a LIDAR sensor and the one or more digital images comprise one or more LIDAR images; the personal computing device operating a digital interface allowing the acquired one or more digital images to be uploaded to one or more analysis computation servers; the one or more analysis computation servers executing an analysis process upon the uploaded one or more digital images allowing determination of a presence of one or more *Enterobius vermicularis* eggs within the sample; the analysis process outputs a first confidence interval value representing a likelihood of the presence of one or more *Enterobius vermicularis* eggs within the sample, wherein the analysis process identifies one or more objects within the one or more LIDAR images and compares the identified one or more objects to a plurality of reference parameters in order to determine the first confidence interval value; the one or more digital images comprise one or more reference images and one or more sample images; the analysis process divides the one or more reference images into a first array of pixels and the one or more sample images into a second array of pixels corresponding to the first array of pixels; and the analysis process measures a first plurality of lumen values for the first array of pixels and a second plurality of lumen values for the second array of pixels, wherein the first plurality of lumen values are differentially compared to the second plurality of lumen values in order to determine a second confidence interval value; and wherein the one or more analysis computation servers communicate the first confidence interval value and the second confidence interval value to the personal electronic device.

Exemplary embodiments of the present invention are illustrated in the accompanying figures. As shown in FIG. 1A, an envelope test kit 100a is provided. The envelope test kit 100a may be disposed within a packaging envelope. The envelope test kit 100a may comprise a substrate layer 110, an adhesive layer 120 and a protective layer 130.

Substrate layer 110 may preferably be rectangular in shape for ease of handling but may be any suitable shape such as square, oval, circular, triangular, hexagonal and the like. The size of the substrate layer 110 is preferably 1 to 10 inches long and ¼ to 5 inches wide. The substrate layer 110 should be large enough to take a sample substantial enough so that an accurate result can be provided. Most preferably the size of the substrate layer will be 2-4 inches long and ½-1 inch wide. The elongated shape allows ease of use while taking a sample from the desired area. The substrate layer 110 may provide a high contrast background. The substrate layer 110 may be colored in a manner so as to provide a high contrast to easily be distinguished from pinworm eggs. The substrate layer 110 may be made of any non-toxic hypo-allergenic materials.

Adhesive layer 120 may be shaped to match substrate layer 110 but may be any suitable shape including square, oval, circular, triangular, hexagonal and the like. The adhesive layer 120 may preferably be between 50% and 100% of the area of the substrate layer 110. Adhesive layer 120 may take up a substantial area of the substrate layer 110 so as to increase the surface area to which the sample can adhere. Therefore, it is most preferable for the adhesive layer 120 to take up 80% or more of the area of substrate layer 110.

The adhesive layer 120 may be semi-transparent or fully transparent. Fully transparent is preferable to provide the best ability for the pinworm eggs to stand out against the high contrast substrate layer 110. The adhesive layer 120 may be made of one or more non-toxic hypo-allergenic materials. Alternatively to the colored high contrast background provided by the substrate layer 110, the adhesive layer 120 may include one or more contrast agents such as a coloring or dye added to the adhesive to enhance the visual contrast. This coloring or dye is preferably dark such as black or dark gray to provide a better contrast with the pinworm eggs.

In another embodiment, one or more iodine-based compounds may be utilized as contrast agents. Specifically, starch paper may be used with the substrate layer 110 and then the one or more iodine-based compounds applied thereto in order to turn the color of the starch paper into a shade of blue. However, if the sample upon the substrate contains pinworms, then the pinworms will turn a shade of brown as the pinworms are generally transparent in color and so will take the natural color of the one or more iodine-based compounds. This provides a high contrast background for detecting the presence of pinworm eggs.

Other additives may be added to the adhesive in the adhesive layer 120 such as pin worm egg modifiers. Pinworm egg modifiers are any agent to change the egg characteristics to become more detectable. These modifiers can include dyes to color the eggs and make them more visible, an agent to alter the boundary of the egg to make it more distinct during detection, or an agent to kill the egg to change the shape to one more distinct and detectable. Killing the egg provides improved detection abilities while reducing the possibility of spreading infection.

The protective layer 130 may be semi-transparent or fully transparent. Just as with the substrate layer 110 and adhesive layer 120, the protective layer 130 may be made of one or more non-toxic hypo-allergenic materials. It is understood that any of the substrate layer 110, adhesive layer 120 or protective layer 130 may be used as the collection substrate. Additionally, the protective layer 130 may include a tab 132 to help an individual grip and peel away the protective layer 130 prior to taking the sample. The tab 132 may also be transparent or may be a high contrast color to help an individual visualize where to grip the protective layer 130 to peel it away. The shape of the protective layer 130 should match the shape of the substrate layer 110 and adhesive layer 120. The size of the protective layer 130 may be any suitable size but may preferably be at least as big as the adhesive layer 120 to cover the adhesive and the sample and not larger than the substrate layer 110.

The substrate layer 110 or adhesive layer 120 may include a translucent object having the same general shape and size as a pinworm egg. This translucent object will be referred to as an optical watermark as it may be used during an analysis process described herein to improve the confidence of a positive or negative test result. The optical watermark egg may be located in any predetermined location of the substrate layer 110. If the location is not predetermined by the analysis process, then this optical watermark egg could result in a false positive test result since it might appear similar to an actual pinworm egg. An optimal location for the optical watermark egg may be in one of the corners of the substrate layer 110 as the sample is likely to be centered upon substrate layer 110.

In some embodiments, a serial number or expiration date may be written upon and/or encoded into the optical watermark. This may be done in order to provide fidelity to the system and further allows the detection system to authenticate the collection substrate as one compatible with the detection system. This ensures that the individual of the detection system will receive accurate results and will not act upon false positives or negatives. Additionally, a barcode and/or RFID tag may be utilized to encode the optical watermark, the serial number and/or the expiration date.

In order to improve visibility during imaging, it is understood that the kit 100*a* can include a separate or built in light source. If the light source is built in, then it may be added to the substrate layer 110 and may be selectively activated. The light source can be any color so long as it improves imaging analysis by providing the necessary contrast. The substrate layer can have a built in battery or any other power source for powering the light source upon activation. If automatic or remote activation are used then the substrate layer should also have the necessary components to provide wired or wireless communication.

Alternatively, one or more starworm devices may be utilized as the light source. The one or more starworm devices may transform the otherwise translucent pinworm eggs of the sample into luminous objects that are easily detectable and therefore may be processed in a high-volume environment or without the need for any automatic detection system at all but rather by the individual or a technician.

The envelope test kit 100*a* may come pre-packaged in an envelope where the individual may first open the envelope and removes the test kit 100*a*. Then the individual may grip the tab 132 and remove the transparent cover 130 from the substrate layer 110 and adhesive layer 120. The individual may apply the adhesive layer 120 to the skin for sampling in order to adhere the sample to the adhesive layer 120. The substrate layer 110 may then be placed on a flat surface and imaged. The protective layer 130 can be reapplied over the adhesive layer 120 either before or after imaging. Finally, the kit 100*a* is reinserted into the same envelope for sanitary disposal. It is also understood that the envelope may be pre-labeled with an address of a medical office or laboratory so that the envelope may be sent to a medical office or laboratory for further analysis if desired by an individual.

Figure 1B:
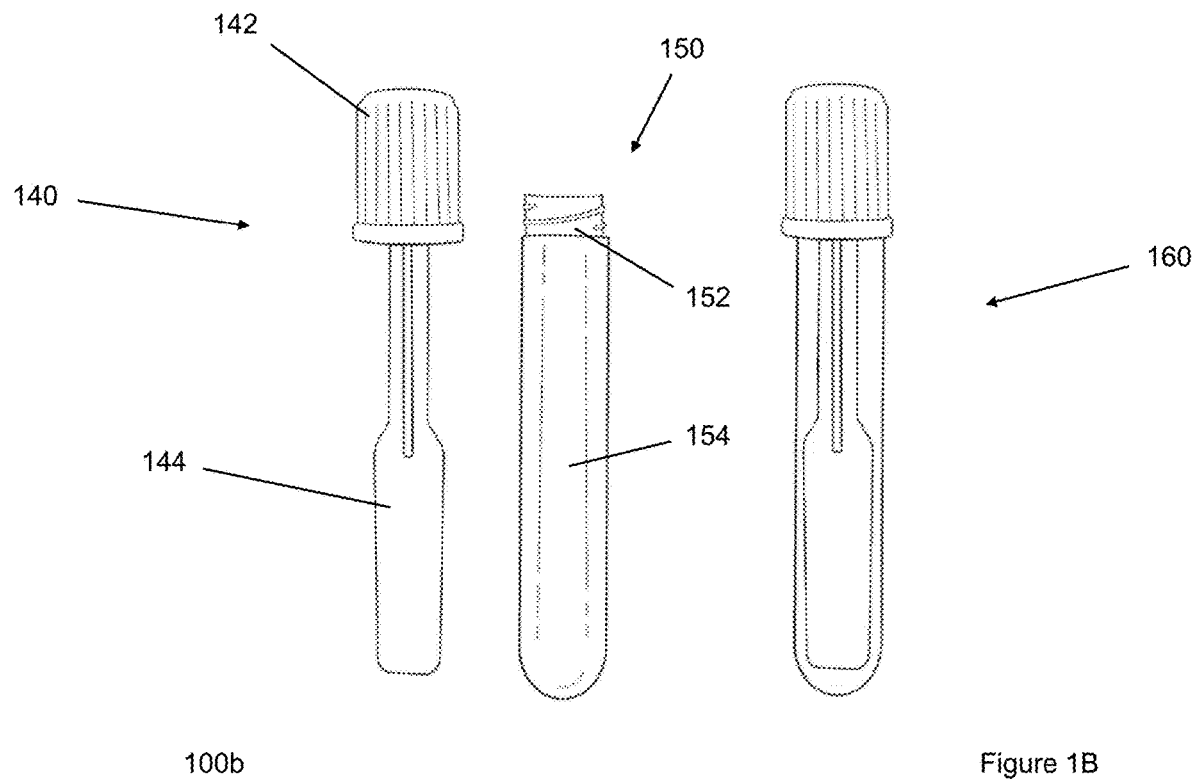
FIG. 1B is a view of a paddle test kit in accordance with some embodiments of the present invention.

As shown in FIG. 1B, a paddle test kit 100*b* may be provided. The paddle test kit 100*b* may comprise a paddle 140 and a container 150. The paddle 140 and container 150 are shown on the left in the disassembled state and on the right in the assembled state 160. The paddle 140 may comprise a paddle plate 144 with an adhesive surface or adhesive layer for securing the sample thereto. The paddle 140 may further comprise a handle 142 for gripping by an individual while taking the sample. A narrowed stem may extend between the paddle plate 144 and handle 142. The handle 142 may be shaped as a ribbed or knurled knob to improve ease of gripping.

Paddle plate 144 is preferably rectangular in shape with rounded corners. The elongated shape better fits the shape of the area which the sample is to be taken from. It can, however, take other shapes, such as square, oval, circular, triangular, hexagonal, other polygonal shapes and the like or any combination thereof. The size of the paddle plate 144 is preferably 1 to 10 inches long and ¼ to 5 inches wide. The paddle plate 144 may preferably be of a size between 2-4 inches long and ½-1 inch wide since this is sufficient to get a large enough sample and also not to large as to waste materials and be difficult to handle.

The paddle plate 144 may provide a high contrast background in relation to the transparent adhesive layer that is disposed on the paddle plate 144. The paddle plate 144 may be colored in a manner so as to provide a high contrast to easily be distinguished from pinworm eggs. The paddle plate 144 may be made of any non-toxic hypo-allergenic materials. The adhesive layer may be shaped to match paddle plate 144, which is preferably rectangular in shape. Just as with the paddle plate 144, the adhesive layer can be other shapes such as square, oval, circular, triangular, hexagonal, other polygonal shapes and the like or any combination thereof. The adhesive layer may preferably between 50% and 100% of the area of the paddle plate 144. The adhesive layer should take up a substantial area of the paddle plate 144 so as to increase the surface area to which the sample can adhere, therefore it is most preferable for the adhesive layer to take up 80% or more of the area of the paddle plate 144.

Although it is possible to provide the adhesive layer on both sides of the paddle plate 144, it is preferable to only apply it to a single surface since this reduces costs. The individual only needs a single surface to have adhesive on it to retrieve a good sample. Additionally, if sample is collected with both surfaces of the paddle plate 144, then the individual would need to image both sides for analysis in order to get an accurate result.

The adhesive layer on the paddle plate 144 may be semi-transparent or fully transparent to provide the best ability for the pinworm eggs to stand out against the high contrast paddle plate 144. The adhesive layer may be made of one or more non-toxic hypo-allergenic materials. Additionally, the paddle plate 144 or adhesive layer may include the coloring or dye described above in test kit 100a. The adhesive layer may include the other additives or pinworm egg modifiers as described above.

The narrowed stem may extend between paddle plate 144 and handle 142 and may be anywhere between 1 and 5 inches long. Preferably the stem is about 2 inches long because this length would best fit a majority of individuals in providing enough spacing between the handle 142 and paddle plate 144 to reach the desired sample area, but not too long that it is flimsy and difficult to acquire the sample. The cross-sectional shape of the narrowed stem can take any shape such as round, oval, triangular, square, rectangular, pentagonal, hexagonal, star shaped, or any other polygonal shape. A round cross section is preferable since this would likely be the easiest and most inexpensive to manufacture. The diameter or thickness of the stem is preferably between ¼ and ½ inch. This thickness ensures that the paddle plate 144 can reach the desired area without interference but it is thick enough to provide the necessary support and prevent it from breaking. Although this is the preferable thickness range, the thickness or diameter can be anywhere between ⅛ and 1 inch.

The narrowed stem should be the same color and material as the paddle plate 144. It is also preferable that the paddle plate 144 and stem are integrally manufactured together to provide the strongest connection. However, if necessary the stem can be manufactured separately from the paddle plate 144 and attached by a connection means such as snap fit, threading, bayonet connection, or the like. The handle 142 is preferably circular in cross section with a ribbed or knurled outer surface for gripping. It can however take other cross-sectional shapes, such as square, oval, rectangular, triangular, hexagonal, star shaped, and other polygonal shapes. The diameter of the handle 142 is preferably 1 to 3 inches while the height is preferably also 1 to 3 inches. The handle 142 should be larger in diameter than the width of the paddle plate 144 in order to be able to fit within the container 150. Therefore, the most preferable diameter of the handle of the paddle plate 144 will be 2 inches since this is larger than the preferable width of the paddle plate 144 but not too large for an individual to easily grip the handle 142 with a few fingers.

The handle 142 should be the same color and material as the paddle plate 144 and the narrow stem. It is also preferable that the handle 142 and stem are integrally manufactured together to provide the strongest connection. However, the handle 142 may be manufactured separately from the stem and attached by a connection means such as snap fit, threading, bayonet connection, or the like. Additionally, the handle 142 may include some kind of attachment means for connecting to the container 150. These attachment means may be on the internal surface of the handle 142 and are preferably threads. Alternatively, the handle 142 can include a snap fit or bayonet feature for interconnecting with a corresponding attachment feature on the container 150.

Container 150 includes a hollow elongated body 154 and external threads 152 at an upper end of the elongated body 154. The upper end of the elongated body 154 also includes an opening through which the paddle plate 144 is inserted and removed. The elongated body 154 is preferably cylindrical but can also take other shapes. For example, elongated body 154 can be triangular, square, rectangular, hexagonal, or any other polygonal shape in cross section. A cylindrical shape is preferable because this provides a smooth outer surface and also allows the paddle 144 to easily rotate within the interior of the hollow cylindrical elongated body 154. It is also possible to replace the external threads 152 with another type of attachment means to match the corresponding attachment means on the handle 142. This can includes snap fit or bayonet features on the external surface at the upper end of the body 154.

Container 150 is preferably transparent so that the individual can view the sample within the body 154. It is possible that the paddle 140 can be imaged through the container 150 is the container is transparent. The container 150 can be made of the same material as the paddle 140, however the container 150 can also be made of any other transparent plastic or polymeric material.

The length of the container 150 should be slightly longer than the overall length of the paddle 140. The container 150 can be anywhere from 4 to 12 inches long, and is most preferably 6-8 inches long. The length of the container 150 is selected to be slightly longer than the overall length of the paddle 140 so that the paddle plate 144 and stem can fit entirely within the container 150 and the internal threads on handle 142 can engage with the external threads 152 on the body 154. In order to reduce material costs, it is preferable that the length of the container 150 is selected to be just long enough to fit the paddle plate 144 and stem. The outer diameter of the container 150 should be slightly larger than the width of the paddle plate 144. Additionally, the outer diameter at the external threads 152 should be substantially equal to the inner diameter at the internal threads inside of handle 142.

The paddle plate 144 may include an optical watermark egg similar to the one described for kit 100a. The optical watermark egg may be located anywhere on the paddle plate 144 as long as it is predefined or known to the analysis process. An optimal location for the optical watermark egg may be in one of the corners of the paddle plate 144 for the same reasons as described above.

In order to improve visibility during imaging, it is understood that the kit 100b can include a separate or built in light source, similar to the light source described for kit 100a above. If the light source is built in, it may be added to the paddle 144 and can be activated by a button, switch, twisting, automatically, or remotely through the software interface. The use of a button or switch may be easy to integrate into the paddle 144, stem, or handle 142. In order to reduce spreading, the light source button or switch would preferably be integrated into the handle 142.

The light source can be any color, as described for kit 100a. The paddle plate 144, stem, or handle 142 can have a built in battery or any other power source for powering the light source upon activation. If automatic or remote activation are used, then the paddle plate 144, stem, or handle 142 should also have the necessary components to provide wired or wireless communication. Additionally, one or more sources of UV light may be utilized to sanitize or disinfect the collection substrate handled by the individual. Additionally, the various components of kit 100b, including the paddle 140 and container 150, are preferably injection molded. Other techniques such as additive manufacturing may be used, but injection molding would be the most cost effective and efficient means of manufacturing the kit 100b.

The paddle test kit 100b may come pre-packaged in an envelope or box. In one embodiment, to use the paddle test kit 100b the individual first opens the envelope or box and removes the test kit 100b. Then the individual unscrews and removes the paddle 140 from the container 150. The individual grips the handle 142 and applies the adhesive layer on the paddle plate 144 to the skin to be sampled in order to adhere the sample to the adhesive layer. Then the paddle 140 can be placed on a flat surface and imaged. Finally, the kit 100b is reinserted into the same envelope or box for safe disposal. Similar to kit 100a, the envelope or box of kit 100b can be pre-labeled with an address and it can be mailed to a medical office or laboratory for verification of a positive or negative result.

As shown in FIG. 2, an envelope test kit 210 is being digitized. The envelope test kit is similar to the envelope test kit 100a shown in FIG. 1A with a substrate layer and an adhesive layer. In this test kit 210 an optical watermark egg 212 is shown on the test kit 210. The test kit 210 is placed on a surface 220 which may or may not be high contrast. Preferably the surface 220 is high contrast in relation to the test kit 210 for reasons which will be described later on.

The individual may use a mobile device having a camera, display, and processor. Any mobile device with these features can be used such as a mobile phone, personal digital assistant (PDA), smartphone, tablet, computer, digital cameras such as DSLR, or any other handheld computing device. Preferably the camera is a high resolution camera. Preferably the resolution of the camera should be 5 megapixels or greater. Higher resolutions will provide more accurate results and typical high resolution mobile device resolutions are currently as high as 12 megapixels. High resolution cameras can be over 100 megapixels. It is understood that this method can be used with any smartphone or tablet since most people have at least one smartphone or tablet with a camera, and so resolutions of 5 megapixels or greater will be sufficient to provide accurate positive or negative test results. Additionally, one or more microimaging techniques which may utilize one or more lenses or prisms to make the imaging process more accurate and thereby allow the detection system to process other diseases.

The individual places the test kit 210 on the surface 220 and uses a device including a camera to take an image of the test kit 210 with the sample. In the embodiment shown a method of image alignment is provided in order to ensure that the entire test kit 210 is within the image with the correct size and orientation in order to provide consistency and accuracy during imaging. This method is similar to methods used for depositing checks with a mobile device camera. For example, an alignment guide 250 is displayed on a display 230 of the mobile device shown. The display 230 also displays a field of view of the camera. The individual then adjusts the mobile device until the image 240 of the test kit 210 fits within and aligns with the alignment guide 250.

The mobile device includes instructions stored in a non-transitory computer-readable medium which are executed by the processor of the mobile device to carry out the method. These instructions cause the display 230 to display the field of view of the camera, the image 240 of the test kit 210, and the alignment guide 250. The mobile device also monitors the image 240 in relation to the alignment guide 250 to automatically determine whether the image 240 properly aligns with the alignment guide 250. Once the processor determines that the image 240 properly aligns with the alignment guide 250 then the processor causes the camera to acquire an image and the image is automatically transmitted to one or more remote computation servers for analysis.

The processor may perform various operations on the image to make the image cleaner for analysis. For example, the processor may automatically crop the image 240 or perform edge detection of the image 240 of the test kit 210 prior to transmitting the image for analysis. This cleans the edges and makes the analysis process easier. Additionally, the processor can skew or distort the image 240 if it is not rectangular in order to make analysis easier.

Below, an automatic analysis process will be described in detail. The analysis process may further comprise one or more LIDAR techniques. It is understood that these steps will build off one another, such that each step is carried out in order to enhance the confidence interval value of the positive or negative test result of the analysis process. However, it is also possible to simplify the analysis process by implementing any single step of the process on its own or in any ordered combination. In some embodiments of the analysis process, the individual takes a reference image of the sample substrate before obtaining the sample. After the individual retrieves the sample, a sample image is taken. Some of the analysis process steps may only require the sample image. Some of the analysis process steps may only require reference parameters for use with the one or more LIDAR techniques. The reference parameters may be pre-determined based in part upon the typical physical and optical characteristics of pinworm eggs.

In some embodiments of the analysis process, the analysis process divides the reference image and sample image into a predetermined number of pixels. The number of pixels may be determined by the analysis process based on a general size of a pinworm egg so that a pinworm egg will fit into a single pixel. The reference image and the sample image should have the same number of pixels. The size of an egg is typically around 55 microns and, therefore, pixels may be 55 microns×55 microns but may be of any suitable dimensions. Further, pixel dimension may be dynamically altered by the analysis process after any given iteration of any step thereof.

The analysis process may assign a number or value representing the reflected light in lumens or lux for each pixel of each image. The pixel may represent one individual pixel of the array, a cluster or pixels of the array, or the entire array itself. Clustering groups of pixels together may simplify the detection method and thereby reduce the processing burden. The analysis process may sum the lumen values for each pixel in the reference image and sum the lumen values for each pixel in the sample image to determine a total lumen value for each of the reference image and sample image. The analysis process may calculate the difference in total lumen value (ΔL) for the reference image and the total lumen value for the sample image to determine the difference in total lumen value. This difference in total lumen value may be used to determine whether comparative pixel anomalies exist in the sample.

A comparative pixel anomaly (e.g. indicative of a pinworm egg) may exist in the sample if ΔL is greater than zero taking into account a +/−5% error. A higher difference will indicate a higher confidence value for a comparative pixel anomaly and a lower difference will indicate a lower confidence value for a comparative pixel anomaly. Therefore, qualitative metrics (e.g. labels) may be utilized to provide a confidence value of a determination of pinworm egg presence based upon the ΔL value. Alternatively, quantitative metrics (e.g. 1-10 scale) may be utilized to provide a confidence value of a determination of pinworm egg presence based upon the ΔL value.

In some embodiments of the analysis process, the analysis process may assign a number or value representing the reflected light in lumens or lux for each pixel of each image. In some cases, a difference (ΔL) is taken between the lumen sums of the reference and sample images. In others, a difference in lumen value is taken for each pixel across the array of pixels. Then the analysis process may calculate the difference in lumen value for each pixel between the reference image and sample image. For example, say reference image (RI) pixels 1, 2 and 3 have a lumen value of 0, 2 and 1, respectively, and sample image (SI) pixels 1, 2 and 3 have lumen values of 12, 23 and 1, respectively. For example, these results provide a low confidence presence of a pinworm egg in pixel 1, a high confidence presence of a pinworm egg in pixel 2, and an absence of a pinworm egg in pixel 3. The low confidence result in pixel 1 could be due to the presence of high glare components in the pixel or could be because a pinworm egg is spanning between pixel 2 and one or more adjacent pixels.

In this step of the analysis process, pixel 1 represents the predesigned tagged object so provide a comparative lumen value for which a comparative pixel anomaly exists. This method eliminates errors in non-relevant pixels related to unwanted glare from adhesive or other things. For example, makeup includes components that can cause glare when imaging the sample. By determining the difference in RI pixel 1 and SI pixel 1 the analysis process can determine an error and then extrapolate that error across the rest of the pixels. This eliminates irrelevant pixels that could result in a false positive.

In some embodiments of the analysis process, a reference image is not needed if an optical watermark is utilized. The optical watermark preferably may have identical characteristics to a pinworm egg such as size, shape and optical transparency. The location of the optical watermark on the substrate layer or paddle may be predetermined and may be located such that it falls within one or more pixels in the array of pixels.

In this step of the analysis process, rather than comparing each pixel in the sample image to the corresponding pixel in the reference image, each pixel in the sample image may be compared to the pixel containing the optical watermark. The optical watermark pixel may have a lumen value such that, when compared to each other pixel in the sample image, a greater difference will indicate an absence of pinworm eggs in that pixel and a smaller difference will indicate a higher likelihood of the presence of pinworm eggs in that pixel. This step may be prone to undercounting pinworm eggs because when eggs span between more than one pixel this can provide a false negative result. In this method, an error range of +/−9% is used instead of the 5% error range of previous methods.

For example, say the optical watermark pixel has a lumen value of 21, RI pixel 1 has a lumen value of 0, RI pixel 2 has a lumen value of 11, and RI pixel 3 provides a lumen value of 22. These results indicate the absence of a pinworm egg in pixel 1, a low confidence presence of a pinworm egg in pixel 2, and a high confidence of presence of a pinworm egg in pixel 3. The low confidence result in pixel 2 could be due to the presence of high glare components in the pixel or could be because a pinworm egg is spanning between pixel 2 and one or more adjacent pixels.

In some embodiments of the analysis process, steps are taken to account for eggs that are spanning two or more pixels across the boundaries thereof. This helps to provide a more accurate count of eggs, but is not necessary to providing a high confidence positive or negative test result. This method iteratively shifts the pixel boundaries by a predetermined amount (e.g. a fraction of a pixel dimension) for a set number of iterations. For example, this method would shift the pixel boundary 5 microns in a certain direction and repeat one or more of the aforementioned steps.

In some embodiments of the analysis process, steps divide each pixel in the array of pixels into sub-pixels and each sub-pixel has a lumen value. In this step of the analysis process, a presence of a pinworm egg is indicated when the distribution of lumen values for the sub-pixels indicate a Gaussian or normal distribution. Essentially the Gaussian or normal distribution should represent a bell curve, since the sub-pixels near the boundary of the pinworm egg will have a smaller lumen value while the sub-pixels which entirely overlap the pinworm egg will have a larger lumen value. A Gaussian or normal distribution indicates a high confidence presence of a pinworm egg. If the distribution is not Gaussian or normal this may indicate that the reading for that given pixel was an error or a false positive. Since a typical pixel will be about 55 microns×55 microns, these sub-pixels may be somewhere between 5 microns×5 microns and 10 microns×10 microns or the like.

In some embodiments of the analysis process, pixels are shifted (e.g. a distance equal to a fraction of a pixel dimension) to account for pinworm eggs spanning between two or more pixels. However, instead of shifting the pixels, this step may change the dimensions of the pixels to account for these eggs that span two or more pixels. This method can be used to deduplicate the egg count error from aforementioned methods. For instance, a cluster of individual pixels may be analyzed instead of each individual pixel. This allows for a reduction in the processing burden associated with the detection system. The change in dimension can include increasing the size of the pixels or decreasing the size of the pixels.

For example, if a low confidence reading occurs at two or more pixels, then this method would change a number of adjacent pixels into a single pixel to determine if a single pinworm egg is located in this larger pixel cluster. If a pinworm egg is spanning two or more pixels a low confidence reading would likely occur in two, three, or four adjacent pixels. Therefore, by changing these four pixels into a single larger pixel the analysis process may determine if a pinworm egg is present in this single larger pixel or if the low confidence value was an error.

In some embodiments of the analysis process, one or more steps may comprise analyzing the sample image using LIDAR techniques. In this method, the known typical size and shape of a pinworm egg is taken into account to determine the presence of pinworm eggs in the sample. A camera with LIDAR capabilities may be used to take an image of the sample on the kit. The known size and shape of a pinworm egg may be referred to as reference parameters. After the LIDAR image is taken to create a three-dimensional or topographical map of the sample, the algorithm may compare dimensions of any three-dimensional objects that are identified in the sample to the reference parameters. A threshold may be used when comparing the objects in the sample to the reference parameters in order to determine the likelihood of the presence of pinworm eggs.

The LIDAR technique can use an optical watermark to help define the reference parameters. As with the optical watermark above, the location, size, and shape of the optical watermark should be predetermined and known to the algorithm. Additionally, the LIDAR technique may be implemented as an alternative or an additive supplementary method to provide an additional layer of confidence to the aforementioned automatic detection methods.

The LIDAR technique may also utilize ultraviolet light to kill the pinworm eggs. By killing the pinworm eggs their shape changes to another different predetermined size and shape that may be more easily recognizable and comparable to the reference parameters. Another alternative would be to oxygenate the sample for a certain amount of time, such as six hours, to change the shape and size of the eggs to a size and shape that may be more recognizable and comparable to the reference parameters. The ultraviolet light and oxygenation may be used for aforementioned steps as well.

FIG. 3 demonstrates the process 300 for carrying out one or more steps of the analysis process. At step 310, prior to taking the sample, the individual obtains a reference image of the testing substrate. Following this the individual obtains the sample and then at step 320 obtains a simple image of the testing substrate with the sample. At step 330, as described above, the reference image is divided into a number of pixels and the sample image is divided into a number of pixels. The number of pixels between the reference image and sample image may be divided into the same array of pixels. Then at step 340 the lumen values between corresponding pixels in the pixel array of the reference image and the pixel array of the sample image are compared. Finally, at step 350 the comparison may be analyzed to determine a confidence interval value that pinworm eggs are present and have been detected. This confidence interval value may based upon the lumen differentials in relation to a threshold. For example, if the lumen differential for a reference image pixel and its corresponding sample image pixel is above a predetermined threshold, then this may provide a positive result indicating the presence of a pinworm egg or vice versa. If the lumen differential is below a predetermined threshold, then this may provide a negative result indicating the absence of a pinworm egg or vice versa.

Figure 4:
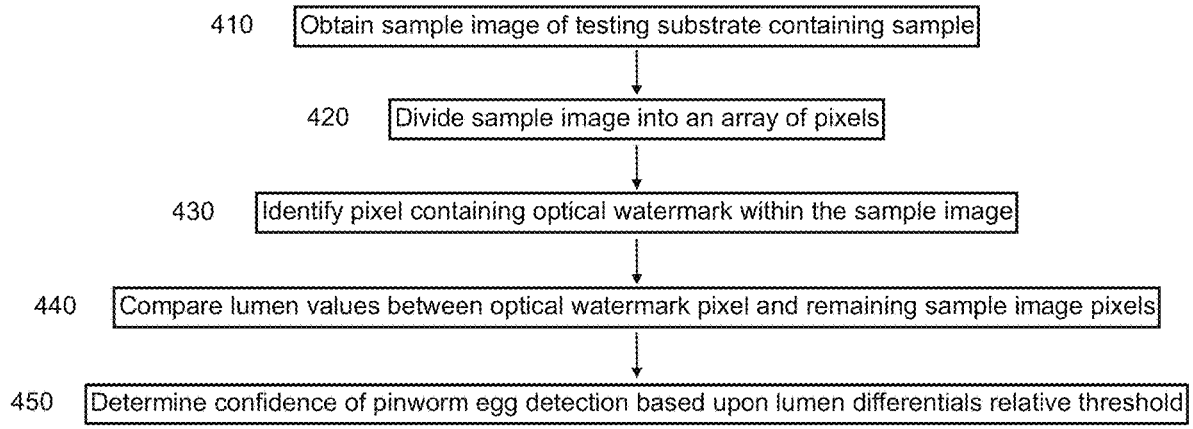
FIG. 4 is a flow chart of a detection method comparing lumen values between sample pixels and optical watermark pixels in accordance with some embodiments of the present invention.

FIG. 4 demonstrates the process 400 for carrying out one or more steps of the analysis process. At step 410, after the individual has obtained the sample on the sample substrate, the individual obtains a sample image of the testing substrate with the sample contained thereon. Following this, the sample image is divided into an array of pixels at step 420. Then at step 430 the pixel containing the optical watermark is identified within the sample image. At step 440 the lumen value of the pixel containing the optical watermark is compared to each individual pixel in the sample image. Finally, at step 450, the comparison is analyzed to determine a confidence that pinworm eggs are present and have been detected. This confidence is based upon the lumen differentials between the optical watermark pixel and each other pixel in the pixel array in relation to a threshold. For example, if the lumen differential for the optical watermark pixel and another pixel is above a predetermined threshold, then this may provide a negative result indicating the absence of a pinworm egg or vice versa. If the lumen differential is below a predetermined threshold, then this may provide a positive result indicating the presence of a pinworm egg or vice versa.

Figure 5:
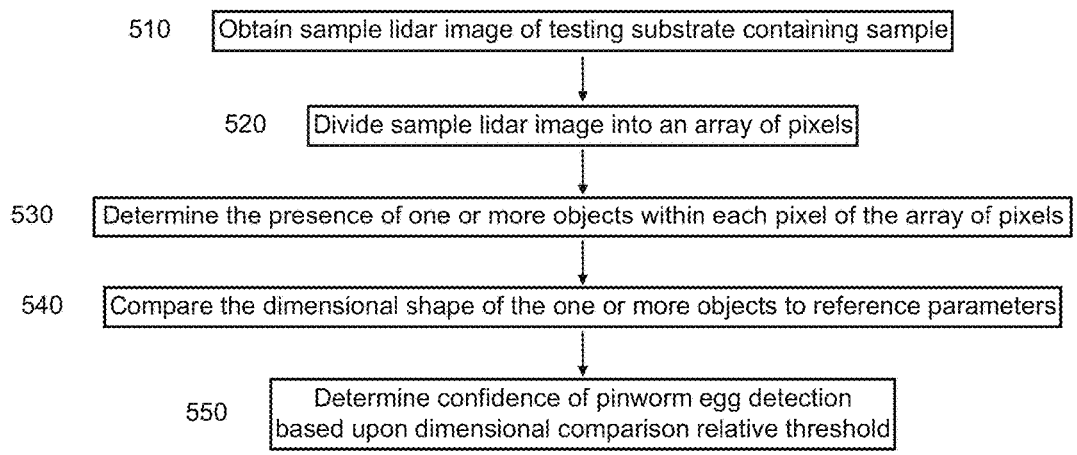
FIG. 5 is a flow chart of a LIDAR-based detection method in accordance with some embodiments of the present invention.

FIG. 5 demonstrates the process 500 for carrying out one or more LIDAR techniques. The LIDAR techniques may not require the use of a reference image and may instead use a sample image and reference parameters. At step 510, after the individual has obtained the sample on the sample substrate, the individual obtains a sample image of the testing substrate with the sample contained thereon using a LIDAR-capable camera or sensor. Following this, the sample image is divided into an array of pixels at step 520. Then, at step 530, the determination may be made as to a presence of one or more three-dimensional objects within each pixel of the array of pixels. At step 540 the dimensional shape of the one or more three-dimensional objects may be compared to reference parameters. Finally, at step 550, the comparison is analyzed to determine the confidence of pinworm egg detection in relation to a threshold. For example, if the dimensional differential for the reference parameters and three-dimensional object is above a predetermined threshold, then this may provide a negative result indicating the absence of a pinworm egg or vice versa. If the dimensional differential is below a predetermined threshold, then this may provide a positive result indicating the presence of a pinworm egg or vice versa. As described previously, the reference parameters can be predetermined and known within the analysis process or can be determined by using an optical watermark.

With reference to FIGS. 1A, 1B and 2-5, embodiments of the present invention may be implemented utilizing a sample substrate and a sample disposed upon the sample substrate. The sample substrate may take any suitable form including, but not limited to, any aforementioned surface, any planar surface, any surface capable of being imaged and the like or any combination thereof. The sample may take any suitable form including, but not limited to, any biological tissue, any organic material, any inorganic material, any human tissue, any mammalian tissue, any human bodily byproduct, any mammalian bodily byproduct and the like or any combination thereof. Additionally, embodiments of the present invention may be implemented utilizing a personal computing device that may comprise an imaging device for acquiring one or more digital images of the sample substrate. The personal computing device may take any suitable form including, but not limited to, a cell phone, a smart phone, a camera phone, a tablet device, a personal computer, a desktop computer, a handheld computing device, a smart camera, a smart watch and the like or any combination thereof. The imaging device may take any suitable form including, but not limited to, a digital imaging sensor, a LIDAR sensor, a radio imaging sensor, a camera and the like or any combination thereof.

Additionally, with reference to FIGS. 1A, 1B and 2-5, embodiments of the present invention may be implemented utilizing a digital interface operated by the personal computing device to upload the acquired digital images to one or more analysis computation servers. The digital interface may take any suitable form including, but not limited to, a graphical user interface, a software interface, a display interface, a user input interface and the like or any combination thereof. The one or more analysis computation servers may comprise any suitable computing devices including, but not limited to, high performance server computers, a cell phone, a smart phone, a camera phone, a tablet device, a personal computer, a desktop computer, a handheld computing device and the like or any combination thereof. Additionally, embodiments of the present invention may be implemented utilizing an analysis process providing one or more confidence interval values representing a likelihood of the presence of one or more *Enterobius vermicularis* eggs within the sample. The analysis process may take any suitable form including, but not limited to, computer-executable software, computer-executable code, computer-executable algorithms, computer-executable processes and the like that perform analyses upon inputted data to return one or more confidence interval values. The one or more confidence interval values may take the form of any suitable quantitative or qualitative value that represents a likelihood of the presence of one or more *Enterobius vermicularis* eggs within the sample based upon the performed analysis process.

Other types of test kits may be utilized. A finger cover test kit is another type of test kit which could be effective and overcome various disadvantages of prior art testing techniques. The finger cover test kit may include one or more finger covers with one or more adhesive layers or patches disposed on the inside or outside of the one or more finger covers. The one or more finger covers may come pre-packaged and comprise a high contrast color while the adhesive is transparent. The finger covers can be made of material similar to disposable medical gloves, such as latex, nitrile rubber, polyvinyl chloride, and neoprene.

It is also possible to provide the individual with a mounting stand along with the kit. The mounting stand may provide a structure for mounting the mobile device in a fixed relative position in relation to the kit during imaging. This may provide consistency for imaging the sample and ensure that the sample and kit are in the proper orientation and the proper distance from the camera. The mounting stand may have adjustable features so that the stand could be universal for any user mobile device.

As an alternative or additive to the aforementioned analysis process steps, a virtual lab detection step may also be implemented. Specifically, the virtual lab may comprise one or more technicians used to manually analyze the sample images provided by the individual. Utilizing technicians to manually determine the presence of pinworm eggs in the sample will provide an added layer of confidence to the aforementioned analysis process steps.

Each of the aforementioned automatic and manual detection methods utilize the collection of sample and/or reference images as well as other related data. Such data may be iteratively stored, organized, updated and utilized as a reference library for one or more artificial intelligence-based detection methods. Specifically, the reference library may be utilized by the artificial intelligence detection method to self-correct its operation as the reference library obtains more data.

The specification and drawings are to be regarded in an illustrative rather than a restrictive sense. However, it will be evident that various modifications and changes may be made thereunto without departing from the broader spirit and scope of the invention as set forth in the claims. Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a," "an," "the," and similar referents in the context of describing the disclosed embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, although above-described elements may be described in the context of certain embodiments of the specification, unless stated otherwise or otherwise clear from context, these elements are not mutually exclusive to only those embodiments in which they are described; any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

The invention claimed is:

1. An *Enterobius vermicularis* detection system, comprising:
   a sample substrate;
   a sample disposed upon the sample substrate;
   a personal computing device comprising an imaging device acquiring one or more digital images of the sample substrate;
   the personal computing device operating a digital interface allowing the acquired one or more digital images to be uploaded to one or more analysis computation servers;
   the one or more analysis computation servers executing an analysis process upon the uploaded one or more digital images allowing determination of a presence of one or more *Enterobius vermicularis* eggs within the sample, wherein the analysis process outputs a first confidence interval value representing a likelihood of the presence of one or more *Enterobius vermicularis* eggs within the sample, and wherein the one or more analysis computation servers communicate the first confidence interval value to the personal computing device;
   an optical watermark disposed upon the sample substrate, wherein the optical watermark simulates optical characteristics of the one or more *Enterobius vermicularis* eggs;
   the one or more digital images comprise the optical watermark and the sample, wherein the analysis process divides the one or more digital images into an array of pixels;
   the analysis process identifies one or more optical watermark pixels of the array of pixels containing the optical watermark; and
   the analysis process measures a first lumen value of the one or more optical watermark pixels and a second plurality of lumen values for each remaining pixel of the array of pixels, wherein the first lumen value is differentially compared to each of the second plurality of lumen values in order to determine the first confidence interval value.

2. The *Enterobius vermicularis* detection system of claim 1, further comprising:
   the one or more digital images comprise one or more reference images and one or more sample images; and
   the analysis process measures a first lumen value of the one or more reference images and a second lumen value of the one or more sample images, wherein the first lumen value is differentially compared to the second lumen value in order to determine the first confidence interval value.

3. The *Enterobius vermicularis* detection system of claim 1, further comprising:
   the one or more digital images comprise one or more reference images and one or more sample images;
   the analysis process divides the one or more reference images into a first array of pixels and the one or more sample images into a second array of pixels corresponding to the first array of pixels; and
   the analysis process measures a first plurality of lumen values for the first array of pixels and a second plurality of lumen values for the second array of pixels, wherein the first plurality of lumen values are differentially compared to the second plurality of lumen values in order to determine the first confidence interval value.

4. The *Enterobius vermicularis* detection system of claim 3, further comprising:
   the analysis process shifts the first array of pixels a distance equal to a fraction of a pixel dimension to create a first shifted array of pixels and the second array of pixels the distance equal to the fraction of a pixel dimension to create a second shifted array of pixels; and
   the analysis process measures a third plurality of lumen values for the first shifted array of pixels and a fourth plurality of lumen values for the second shifted array of pixels, wherein the third plurality of lumen values are differentially compared to the fourth plurality of lumen values in order to determine a second confidence interval value.

5. The *Enterobius vermicularis* detection system of claim 3, further comprising:
   the analysis process divides each pixel of the second array of pixels into a plurality of sub-pixels and measures a sub-pixel lumen value for each of the plurality of sub-pixels; and
   the analysis process compares a distribution of the sub-pixel lumen values to a normal Gaussian distribution and determines a second confidence interval value based upon the comparison.

6. The *Enterobius vermicularis* detection system of claim 1, further comprising:
   the imaging device comprises a LIDAR sensor and the one or more digital images comprise one or more LIDAR images; and
   the analysis process identifies one or more objects within the one or more LIDAR images and compares the identified one or more objects to a plurality of reference parameters in order to determine a second confidence interval value.

7. The *Enterobius vermicularis* detection system of claim 6, wherein the sample substrate is exposed to ultraviolet light prior to acquiring the one or more digital images of the sample substrate.

8. The *Enterobius vermicularis* detection system of claim 1, wherein, after the acquired one or more digital images are uploaded to one or more analysis computation servers, the one or more digital images are analyzed by one or more human technicians to determine a second confidence interval value.

9. The *Enterobius vermicularis* detection system of claim 1, wherein, prior to the one or more digital images being acquired by the imaging device, one or more contrast agents are added to the sample substrate and the sample.

10. The *Enterobius vermicularis* detection system of claim 9, wherein a second confidence interval is generated by visual analysis of the sample after addition of the one or more contrast agents.

11. An *Enterobius vermicularis* detection system, comprising:
    a sample substrate;
    a sample disposed upon the sample substrate;
    a personal computing device comprising an imaging device acquiring one or more digital images of the sample substrate, wherein the one or more digital images comprise one or more reference images and one or more sample images;

the personal computing device operating a digital interface allowing the acquired one or more digital images to be uploaded to one or more analysis computation servers;

the one or more analysis computation servers execute an analysis process upon the uploaded one or more digital images allowing determination of a presence of one or more *Enterobius vermicularis* eggs within the sample, wherein the analysis process divides the one or more reference images into a first array of pixels and the one or more sample images into a second array of pixels corresponding to the first array of pixels;

the analysis process outputs a first confidence interval value representing a likelihood of the presence of one or more *Enterobius vermicularis* eggs within the sample, wherein the analysis process measures a first plurality of lumen values for the first array of pixels and a second plurality of lumen values for the second array of pixels, wherein the first plurality of lumen values are differentially compared to the second plurality of lumen values in order to determine the first confidence interval value;

the one or more analysis computation servers communicate the first confidence interval value to the personal computing device;

an optical watermark disposed upon the sample substrate, wherein the optical watermark simulates optical characteristics of the one or more *Enterobius vermicularis* eggs;

the one or more digital images comprise the optical watermark and the sample, wherein the analysis process identifies one or more optical watermark pixels containing the optical watermark; and the analysis process measures an optical watermark lumen value of the one or more optical watermark pixels, wherein the optical watermark lumen value is differentially compared to each of the second plurality of lumen values in order to determine a second confidence interval value.

12. The *Enterobius vermicularis* detection system of claim 11, further comprising:

the analysis process shifts the first array of pixels a distance equal to a fraction of a pixel dimension to create a first shifted array of pixels and the second array of pixels the distance equal to the fraction of a pixel dimension to create a second shifted array of pixels; and the analysis process measures a third plurality of lumen values for the first shifted array of pixels and a fourth plurality of lumen values for the second shifted array of pixels, wherein the third plurality of lumen values are differentially compared to the fourth plurality of lumen values in order to determine a second confidence interval value.

13. The *Enterobius vermicularis* detection system of claim 11, further comprising:

the analysis process divides each pixel of the second array of pixels into a plurality of sub-pixels and measures a sub-pixel lumen value for each of the plurality of sub-pixels; and the analysis process compares a distribution of the sub-pixel lumen values to a normal Gaussian distribution and determines a second confidence interval value based upon the comparison.

14. The *Enterobius vermicularis* detection system of claim 11, further comprising:

the imaging device comprises a LIDAR sensor and the one or more digital images comprise one or more LIDAR images; and the analysis process identifies one or more objects within the one or more LIDAR images and compares the identified one or more objects to a plurality of reference parameters in order to determine a second confidence interval value.

15. An *Enterobius vermicularis* detection system, comprising:

a sample substrate;

a sample disposed upon the sample substrate;

a personal computing device comprising an imaging device acquiring one or more digital images of the sample substrate, wherein the imaging device comprises a LIDAR sensor and the one or more digital images comprise one or more LIDAR images;

the personal computing device operating a digital interface allowing the acquired one or more digital images to be uploaded to one or more analysis computation servers;

the one or more analysis computation servers executing an analysis process upon the uploaded one or more digital images allowing determination of a presence of one or more *Enterobius vermicularis* eggs within the sample;

the analysis process outputs a first confidence interval value representing a likelihood of the presence of one or more *Enterobius vermicularis* eggs within the sample, wherein the analysis process identifies one or more objects within the one or more LIDAR images and compares the identified one or more objects to a plurality of reference parameters in order to determine the first confidence interval value;

the one or more digital images comprise one or more reference images and one or more sample images;

the analysis process divides the one or more reference images into a first array of pixels and the one or more sample images into a second array of pixels corresponding to the first array of pixels; and the analysis process measures a first plurality of lumen values for the first array of pixels and a second plurality of lumen values for the second array of pixels, wherein the first plurality of lumen values are differentially compared to the second plurality of lumen values in order to determine a second confidence interval value;

wherein the one or more analysis computation servers communicate the first confidence interval value and the second confidence interval value to the personal computing device;

an optical watermark disposed upon the sample substrate, wherein the optical watermark simulates optical characteristics of the one or more *Enterobius vermicularis* eggs;

the one or more digital images comprise the optical watermark, wherein the analysis process identifies one or more optical watermark pixels containing the optical watermark; and the analysis process measures an optical watermark lumen value of the one or more optical watermark pixels, wherein the optical watermark lumen value is differentially compared to each of the second plurality of lumen values in order to determine a third confidence interval value.

16. The *Enterobius vermicularis* detection system of claim 15, further comprising:

the analysis process shifts the first array of pixels a distance equal to a fraction of a pixel dimension to create a first shifted array of pixels and the second array of pixels the distance equal to the fraction of a pixel dimension to create a second shifted array of pixels; and the analysis process measures a third plurality of lumen values for the first shifted array of pixels and a fourth plurality of lumen values for the second shifted array of pixels, wherein the third plurality of lumen values are differentially compared to the fourth plurality of lumen values in order to determine a fourth confidence interval value.

17. The *Enterobius vermicularis* detection system of claim 15, further comprising:

the analysis process divides each pixel of the second array of pixels into a plurality of sub-pixels and measures a sub-pixel lumen value for each of the plurality of sub-pixels; and the analysis process compares a distribution of the sub-pixel lumen values to a normal Gaussian distribution and determines a fourth confidence interval value based upon the comparison.

\* \* \* \* \*